Oct. 24, 1961 F. E. ROLAND Re. 25,060
IMPACT HOLE FORMING METHOD AND MECHANISM THEREFOR
Original Filed May 1, 1957 2 Sheets-Sheet 1
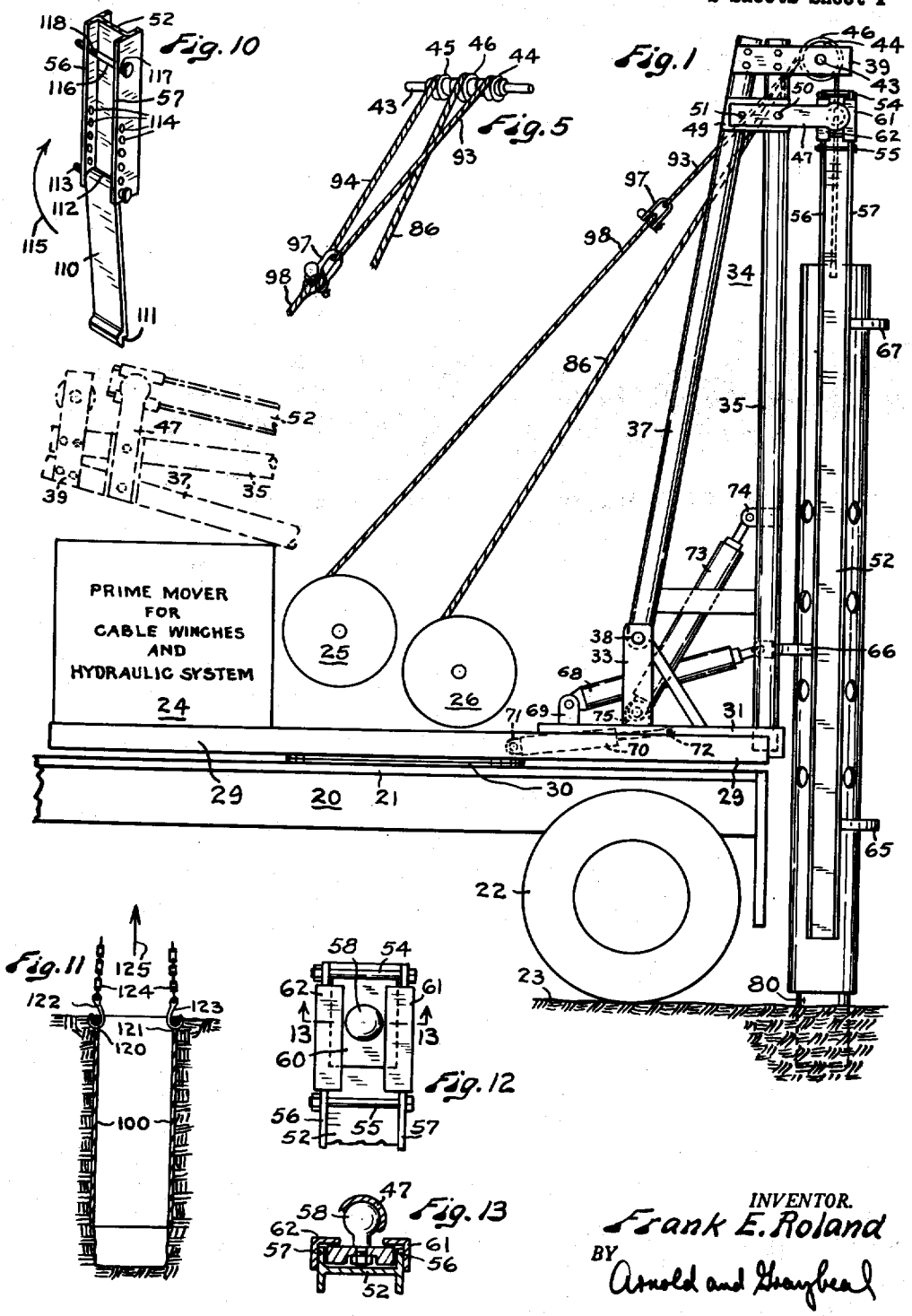
INVENTOR.
Frank E. Roland
BY
Arnold and Hanybeal
ATTORNEYS.

Oct. 24, 1961 F. E. ROLAND Re. 25,060
IMPACT HOLE FORMING METHOD AND MECHANISM THEREFOR
Original Filed May 1, 1957 2 Sheets-Sheet 2
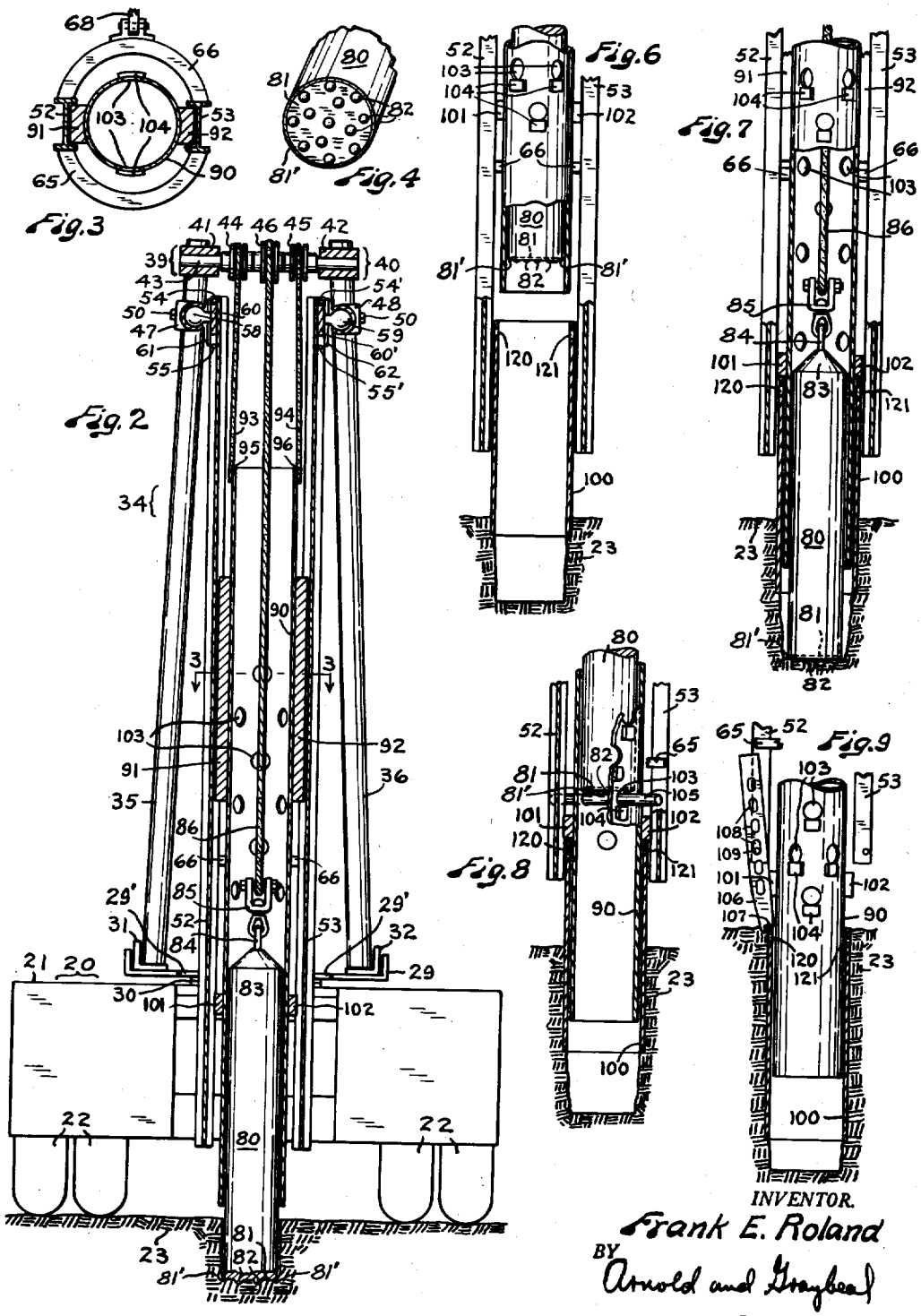
INVENTOR.
Frank E. Roland
BY
Arnold and Graybeal
ATTORNEYS United States Patent Office Re. 25,060
Reissued Oct. 24, 1961

25,060
IMPACT HOLE FORMING METHOD AND MECHANISM THEREFOR

Frank E. Roland, Kent, Wash., assignor to R and W Construction Company, Inc., Auburn, Wash., a corporation of Washington Original No. 2,918,258, dated Dec. 22, 1959, Ser. No. 656,248, May 1, 1957. Application for reissue June 15, 1960, Ser. No. 36,460
21 Claims. (Cl. 175—23)

Matter enclosed in heavy brackets [ ] appears in the original patent but forms no part of this reissue specification; matter printed in italics indicates the additions made by reissue.

This invention relates to a hole forming method and mechanism therefor and more particularly relates to such method and mechanism especially adapted for rapidly and economically making relatively large holes of substantial depth in earth formations and the like where boring or digging is impossible or impractical, the mechanism involved being essentially of the impact type and an improvement over the mechanism disclosed and claimed in my U.S. Patent 2,660,403, issued November 24, 1953, and entitled "Posthole Forming Machine."

Generally stated, the method of hole forming contemplated by the present invention and discovery involves impact hole forming by successive extended free fall drops of a stomper and comprises arranging a hole casing only slightly larger than the stomper axially in the hole being formed, urging the hole casing downwardly into said hole under the force of at least a portion of the dead weight of said stomper but not the drop force of extended free fall thereof, and thereafter progressively and alternately dropping the stomper to deepen the hole and urging the hole casing further downwardly into the hole under such force until the desired hole depth is reached.

An additional feature of the method of hole forming contemplated involves utilizing a vertically movable guide casing in which the stomper reciprocates and about which the hole casing can telescope to a limited degree, interposing a stop means between the stomper and the guide casing, and lowering the stomper against the stop means so that at least a portion of the dead weight of said stomper is selectively transmitted to the hole casing in urging the same into the hole being formed.

Yet another feature of the hole forming method here presented involves utilization of vertically stationary guide means for the aforementioned guide casing and, after the hole is formed with the hole casing in wall supporting position therein, extracting the guide casing from the hole without removal of the hole casing by interposing stop means between said vertically stationary guide means and the upper edge of the hole casing while upwardly withdrawing said guide casing.

Generally speaking, the related hole forming mechanism contemplated by the present invention involves a drop element which I prefer to call a stomper or stomper element but which may be otherwise termed and construed as a drop weight, a hammer, or a hammer bit, concentrically arranged in a guided, vertically movable guide casing for selective raising, lowering or dropping therein, the said guide casing in turn being associated with a hole casing concentrically telescoping to a limited degree over the lower end of said guide casing, and stop means selectively placed in said guide casing in the path of travel of said stomper so that the latter can be selectively lowered against said stop means and transmit at least a portion of its dead weight through the guide casing to the hole casing with sufficient force to urge the hole casing into the hole being formed but without the impact force generated by extended free fall, gravity drop of the stomper.

Considered more specifically, a typical hole forming mechanism contemplated by the present invention comprises mast means mountable uprightly on a ground supported vehicle, a vertically stationary guide rail assembly depending from its upper portion, cylindrical guide casing means mounted for vertical movement between and guided by said guide rails, a blunt, heavy stomper element vertically movable within said guide casing, power means on said vehicle for selectively raising and lowering said guide casing, power means on said vehicle for selectively raising, lowering, or dropping said stomper, lug means exteriorly positioned on the lower end of said guide casing, and a cylindrical hole casing only slightly larger than said guide casing, dimensioned to snugly telescope over the lower end of said guide casing and be moved progressively downwardly by the said lug means thereon into the hole being formed, such progressive movement of said hole casing being caused by progressive and selective downward movement of said guide casing, the said guide casing having a vertically arranged series of opposed pairs of holes therein through which a bar-like element stop means is readily insertable to selectively receive at least a part of the dead weight of said stomper and transfer the same through said guide casing to said hole casing and cause such downward movement of the latter into the formed hole to support the side walls thereof, the said stop means further being readily withdrawable from said guide casing, permitting subsequent drops of said stomper in thereafter driving the hole deeper.

Further specific constructional features of the mechanism characterizing the present invention include; universal mount means for the guide rail assembly, such as ball and socket supporting connectors, insuring a substantially vertical disposition of said guide assembly irrespective of whether the supporting vehicle is level; a second stop means interposable between one of said guide rails and the upper edge portion of said hole casing when the latter is in wall supporting position in the formed hole, such second stop means enabling selective withdrawal of the lower end of said guide casing from said hole casing without removal of the hole casing from the hole; and constructional detail of the said hole casing, wherein opposed apertures are provided adjacent the upper edge portion thereof, facilitating its withdrawal from the formed hole by means of chain hook means or the like engaging said apertures and being moved upwardly.

In view of the foregoing consideration of the general nature of the present invention as well as specific features thereof, it will be readily understood that the hole is formed by the stomper impacting the ground directly, eliminating the necessity for a heavy bit or the like, the improved mechanism and method of hole forming contemplated by this improvement further utilizing a relatively light hole casing which is urged or eased (as distinguished from sharply impacted) into the hole being formed under the force of at least a portion of the dead weight of the stomper element, some or all of the dead weight or selectively controlled slight impact of the stomper element as may prove necessary for this purpose in a particular circumstance being transmitted to the said hole casing by means interposed between the stomper element and the guide casing and by pressure of the lower portion of the guide casing against the hole casing, the said hole casing being telescoped over the said guide casing during this phase of the operation. This distinction in the manner of placement of a casing to support the walls of the hole being formed is of marked importance, rendering possible use of relatively light weight guide and hole forming elements except for the stomper element itself while simultaneously making possible long operative life of the stomper guide casing and hole casing. Hole casings employed in the art are customarily set by impact and necessarily have heretofore been considered as requiring frequent replacement because even though made relatively heavy they become distorted, cracked or fractured in a short time by the drop element impact. Fundamentally, the thin, relatively light casing of the present invention is set in the hole by the dead weight of the stomper and not by sharp impact or extended free fall drop force thereof.

Further, in eliminating from the mechanism any counterpart of a heavy bit driven into the ground which would otherwise necessitate heavy extraction elements, the total weight of the mobile mechanism is substantially reduced and the durability of the ground contacting elements is very effectively improved, since the only element of the improved mechanism subjected to substantial and repeated shock of extended free fall impact is the heavy, preferably solid, stomper element itself.

Characteristically, the hole forming method and mechanism of the present invention will impact a hole without material "humping" of the adjacent ground or structure, the blunt stomper driving earth and rocks or the like downwardly rather than forcing the impacted material to the side as a pointed drop weight or bit does. Also, with a cased hole as provided by the present invention, there is no loss of subjacent support of the ground adjacent to the hole being formed because of the arrangement and manipulation of the thin-walled hole casing of the present invention in the hole to support the hole side walls while and after the hole is formed. These features of no "humping" of the adjacent ground and preservation of the subjacent support in the surrounding area are particularly important and even crucial where, for example, highway guard rail posts are being set along a pavement or asphalt roadway already in place, as for center guard railing or separators, since there if either the roadway level or its support is disturbed the whole area around each emplaced post must then be refinished afterward. My invention is ideally adapted to such heretofore difficult hole forming problems, not only because of the nature of the hole formed (as above discussed) but also because the heavy blunt stomper element of the invention will readily punch through concrete paving, asphalt and road fill with large rocks. Advantageous refinements of the stomper facilitating this action include a raised downwardly directed edge lip and/or intermediate nubs to aid in fracturing and pulverizing these difficult formations.

Another feature found in the nature of the hole formed, in application of the present invention to highway guard rail post placement projects, is the fact that the bottoms of the formed holes are very solid and a given hole depth can be reproduced quite readily, facilitating both uniformity of firmness and depth as to a series of posts placed in a line, as compared with augered holes or holes filled to the given depth by loose dirt, both of these features offering very practical advantages from an operating point of view.

The above features and objects of the present invention and discovery, together with other features and objects thereof will be apparent from the following description and accompanying illustrations of typical mechanism embodying the same, reference being made to the accompanying drawings, wherein:

FIGURE 1 is a view in side elevation, somewhat schematically shown, of hole forming mechanism embodying the present invention, together with a portion of the supporting vehicle and power equipment for operating the mechanism, segments of the mast thereof and associated elements also being shown by dotted line in their position for transport;

FIG. 2 is a view in end elevation of the mechanism shown in FIG. 1, with the guide rails, stomper guide casing and portions of the mast assembly being shown in cross section and with the mast positioning elements and the cable winches omitted for clarity and simplicity of illustration, the position of the equipment being shown shortly after the hole is started;

FIG. 3 is a view in transverse cross section of the stomper guide casing and guide rail assembly taken substantially along line 3—3 in FIG. 2, and omitting the stomper element;

FIG. 4 is a perspective, fragmentary view of the stomper element, showing its lower end portion and particularly the nubbed bottom surface thereof;

FIG. 5 is a perspective fragmentary view of the guide casing sheave wheels and the stomper element sheave wheel at the peak of the mast, together with associated cables respectively connecting the guide casing and stomper element to the power equipment on the supporting vehicle for manipulating the hole forming elements;

FIG. 6 is a view in elevation, with various parts shown broken away and in cross section, of the stomper element, guide casing and guide rail assembly, corresponding to the illustration thereof presented in FIG. 2, but showing progress of the hole being formed to the point where there is risk of the side walls of the formed hole collapsing, a hole casing being inserted so that its lower edge rests in the hole in a position to be urged downwardly therein;

FIG. 7 illustrates the elements shown in FIG. 6, with the stomper guide casing lowered so that the lug means thereon contact and rest upon the upper edge of the hole casing to further urge the latter downwardly into the hole to the extent possible by the weight of the guide casing alone;

FIG. 8 again illustrates the elements shown in FIGS. 6 and 7, with the stomper element raised and a bar element inserted through a selected pair of holes in the guide casing, and with a part of the dead weight of the stomper element resting on said bar element, exerting force through said guide casing and the lug means on the latter to the hole casing for further urging the same into the hole being formed;

FIG. 9 again illustrates the elements shown in FIGS. 6 and 7, the desired depth of hole having been reached and the stomper element withdrawn upwardly, and illustrates use of a guide casing extraction tool interposed between a guide rail and the upper edge of the hole casing enabling withdrawal of the guide casing from the hole without withdrawl of the hole casing;

FIG. 10 presents a somewhat enlarged fragmentary perspective view of a modified form of guide casing extraction means, hingedly mounted on the associated guide rail;

FIG. 11 is an elevational view in cross section of the formed hole with the hole casing in place therein, showing chain hook means applied through the holes adjacent the upper edge of said casing for withdrawal thereof;

FIG. 12 is an enlarged fragmentary view of the upper end of one of the guide rails, showing the ball mounting therefore and the longitudinally movable ball mounting plate, permitting tilting of the guide rail assembly to a substantially vertical disposition even if the vehicle supporting the mast is not level; and FIG. 13 is a cross sectional view taken along line 13—13 of FIG. 12, further showing detail of the ball mounting assembly on the upper portion on each of the guide rails, and further showing a segment of the socket element on the mast in retaining engagement with the ball element of said assembly.

Turning now to a specific consideration of the typical mechanism illustrated in the accompanying drawings, FIG. 1 presents in side elevational view and FIG. 2 presents in corresponding end elevational view a typical embodiment of the present invention. It will be understood that the vehicle, a portion of which is generally indicated at 20, for supporting and giving mobility to the equipment or rig, is of the conventional type, such as a truck having a flat bed 21 with adequate support through rear wheels 22 thereof to position the equipment over the ground 23 in which a hole is to be formed. Flat bed 21 also supports power equipment, conventional per se in the art, including prime mover 24 from which cable winches 25 and 26 are driven, and also including a source for hydraulic fluid under pressure such as a pump, not shown, it being readily understood that conventional control equipment is utilized for selectively manually controlling said cable winches 25 and 26 and the hydraulic system.

Supporting platform 29 mounts said prime mover 24, winches 25 and 26 and the hole forming mechanism and is advantageously mounted on flat bed 21 through a turntable base 30, selectively positionable thereon to place the equipment either over the rear end or laterally at either side of vehicle 20, such selective positioning being most effectively and simply accomplished by bolting, as desired. Supporting platform 29 mounts a mast platform comprising movable supporting rails 31 and 32 with braced, upwardly extending trunnions, one of said trunnions being shown at 33. Supporting platform or deck 29 is centrally cut away at the rear (see FIG. 2 at 29'), to permit angular movement of the suspended hole forming elements, as discussed in greater detail hereafter. Considering the various parts of the equipment arranged in operative position with the hole forming elements extending to the rear of the supporting vehicle 20 as shown in FIG. 1, the mast assembly 34 comprises two rear legs 35 and 36 and two forward legs, one of the later being shown at 37, the said forward legs being pivotally mounted to the said trunnions as at 38.

Rear legs 35 and 36 of mast assembly 34 simply rest downwardly against movable supporting rails 31 and 32, respectively, when said mast assembly 34 is in upright, operative position. This construction and manner of mounting of mast assembly 34 enable it to be tipped forwardly about the pivotal trunnion mountings for being transported over relatively long distances, such transport position of the upper segment of such mast assembly being shown by dotted line in FIG. 1.

Mast assembly 34 mounts at its peak a pair of laterally disposed, rearwardly extending plates 39 and 40, each in turn provided with respective shaft supporting bearings 41 and 42 (FIG. 2). Shaft 43 supported by said bearings 41 and 42 in turn mounts stomper guide casing cable sheaves 44 and 45 and stomper cable sheave 46 (see also FIG. 5).

Near the peak of mast assembly 34 is also mounted a laterally disposed rearwardly extending pair of socket elements 47 and 48, said socket element 47 being fastened to plate 49 on mast legs 37 and 35 as by bolts 50 and 51 and said socket element 48 being mounted on a plate on the right hand pair (as viewed in FIG. 2) of mast legs, in a like manner.

It will be evident that while the support structure for the hole forming equipment is shown in the form of an operatively stationary mast, such could as well be a derrick or crane boom and that the vehicle from which the same overhangs the ground can be any form, multipurpose or otherwise, as may be selected or available for a particular installation.

It being noted that said socket elements 47 and 48 are thus stationarily mounted on the mast assembly 34, particular attention will now be given to the construction by which guide rails 52 and 53 are respectively supported in a substantially vertical, depending position by said socket elements 47 and 48. The detail of the hanger elements dependingly supporting guide rail 52 is presented in FIGS. 12 and 13, it being evident that the construction of the corresponding support elements for guide rail 53 are identical and reversely arranged.

Guide rail 52 is in the form of an I beam with an upper limit bolt 54 and a lower limit bolt 55 passing through the outwardly directed flanges 56 and 57 of said I beam. Ball mount 58 (the corresponding ball mount in socket element 48 being designated at 59 in FIG. 2) is bolted to ball plate 60 which is in turn laterally retained between flanges 56 and 57 of guide rail 52 by said limit bolts 54 and 55 and by inwardly turned angle shaped retainer plates 61 and 62. Such socket elements 47 and 48 and ball mount elements 58 and 59 as are presented in FIG. 2 can advantageously be of the type utilized conventionally for trailer hitch assemblies.

In the light of the foregoing discussion of the ball and socket hanger means from which guide rails 52 and 53 depend, it will be evident that a substantial degree of vertical moveability of guide rail 52 with respect to ball plate 60 is possible. With the supporting vehicle laterally level, both ball plates will rest against and directly support the upper bolt means through the guide rails, such position of support being shown in FIG. 2 and in plan view as to ball plate 60 and upper limit bolt 54 in guide rail 52 in FIG. 12. However, when the supporting vehicle 20 is other than level, laterally considered, the guide rail assembly comprising guide rails 52 and 53 will nevertheless depend from the mast assembly 34 in a substantially vertical disposition. This action is readily demonstrated by noting that when the supporting vehicle 20 is on sloping terrain, sloping downwardly to the right as viewed in FIG. 2, for example, then ball plate 60 will continue to rest against and support guide rail 52 in direct contact with upper limit bolt 54 while the ball plate 60' associated with guide rail 53 will seek and maintain an intermediate position between its upper and lower limit bolts 54' and 55', permitting the guide rail assembly, laterally considered, to seek and maintain a substantially vertical position, depending from upper limit bolt 54. Conversely, if the slope of the ground 23 is downwardly to the left as viewed in FIG. 2, the ball plate 60 moves to an intermediate position between limit bolts 54 and 55 and the guide rail assembly depends from upper limit bolt 54'. It is thus seen that the laterally disposed pair of ball and socket support means for the guide rail assembly constitute a universal type mounting therefor and permit the guide rail assembly to seek a substantially vertical position in a pendulum-like manner.

With a substantially vertical position of the guide rail assembly laterally being thus inherently provided for, it is to be further noted that means are also provided by which the fore-and-aft position and disposition of the guide rail assembly can be adjusted to position the same over the point the hole is to be formed and/or to compensate for fore-and-aft slope of the ground 23 supporting vehicle 20. Said guide rails 52 and 53 are laterally braced and tied together by means of arcuate tie elements 65, 66 and 67 (see FIGS. 1 and 3), the forwardly directed tie element 66 being connected through hydraulic cylinder 68 to tie plate 69 on the mast platform comprising supporting rails 31 and 32. As evident, selective activation of cylinder 68 causes selective positioning of the guide rail assembly fore-and-aft about ball mounts 58 and 59 to compensate for variation from level of the ground 23 in the fore-and-aft direction, i.e. longitudinally, of the vehicle 20.

Fore-and-aft positioning of the guide rails with respect to the point at which the hole is to be formed is also preferably further facilitated by a second hydraulic cylinder 70, connected at one end to platform 29, as at 71 and connected as at 72 at the other end to the mast platform comprising rails 31 and 32, it being readily understood that selective actuation of said hydraulic cylinder 70 will move the entire mast assembly without changing the angular disposition of the guide rail assembly about said ball mounts 58 and 59.

The combined adjustability provided by hydraulic cylinder 68 and by hydraulic cylinder 70 constitutes an important practical advantage in use of the equipment of the present invention, since it is often a difficult and more or less time consuming problem to position the equipment directly over the point at which a hole is to be formed. This is particularly true where holes must be laid out according to a predetermined pattern and in a straight or gradually curved line with uniform separation, as is the case with positioning holes to receive highway guide rail posts. From the point of view of the driver of the supporting vehicle 20, properly positioning the rig at the desired point is much more difficult along the direction of travel than laterally of the direction of travel and the combined adjustabilities involving hydraulic cylinders 68 and 70 effectively overcome this difficulty. This consideration of course primarily pertains to the positioning of the rig and hole forming elements when the latter are disposed on the vehicle 20 in a fore-and-aft manner, such as shown in FIGS. 1 and 2.

A third hydraulic cylinder 73, anchored at one end to a tie plate 74 on rear mast leg 35 and anchored at the other end to tie plate 75 near the bottom of trunnion 33, serves as a hold-down means for the mast assembly 34 when the mast is in operative, upright position (see FIG. 1).

Stomper 80 constitutes the primary hole forming element of the assembly and, in a rig according to the present invention now in operation, typically weighs about 4,000 pounds and is about 14½ inches in diameter and about 7 feet long, turned from solid steel. Stomper 80 at its lower end 81 is essentially blunt, it having been determined that such design of the impact end of a heavy drop element is superior to a pointed or conical shape because the latter type of drop weight or bit has a tendency to be deflected or sheer away from the desired hole axis when encountering irregular rocks or other difficult formations. In contrast, a heavy blunt ended drop weight such as stomper 80 of the present invention will break up the rock formation or the like and punch directly through without substantial deflection from the desired hole center line or axis. It has been further found that the effectiveness of a heavy blunt drop element, particularly in breaking up rock formations or the like, is increased by incorporation of a lipped edge portion 81′ on the lower impacting surface or by a multiplicity of relatively small hemispherically shaped nubs 82, or both, which facilitate initiation of fracture and pulverization of the rock or other like difficult formation at several closely spaced points and contribute to its pulverization by the impact force of the heavy drop element. The effectiveness of a heavy blunt drop element such as stomper 80 of the present invention, particularly when provided with the aforesaid edge lip 81′ and nubs 82 on the lower blunt surface 81 thereof, has been rather remarkably demonstrated by the fact that when very large rocks are encountered at the point where a hole is to be formed, successive drops of such stomper 80 will punch the hole directly through the rock without substantial breakage of the rock beyond the walls of the hole formed, the said edge lip 81′ substantially improving the smoothness and evenness of the formed side walls. As previously noted, both the edge lip 81′ and nubs 82 also facilitate passage of the stomper through paved or asphalt surface layers when encountered, which is often a difficult and frustrating problem with conventional equipment.

Stomper 80 mounts at the conical upper end 83 thereof and eye 84 connected through swivel shackle 85 to stomper cable 86, passed over sheave 46 to winch 26, the latter being driven and controlled by mechanism known to the art to selectively raise, lower or drop said stomper 80 as desired. Said stomper 80 is concentrically surrounded by stomper guide casing 90, in turn guided between guide rails 52 and 53 by respective projecting elements 91 and 92 travelling in the inner flange areas of said guide rails 52 and 53. Said stomper guide casing 90 is of cylindrical, thin walled form, with a wall thickness dimension typically about ⅜ inch, and is selectively vertically movable with respect to said guide rails 52 and 53 and the ground 23 by means of cables 93 and 94 respectively attached as at 95 and 96 to the upper end of said stomper guide casing 90 and respectively passing over sheaves 44 and 45. Advantageously, said cables 93 and 94 are led to a common shackle 97 (see FIG. 5) which is in turn connected by cable 98 to winch 25 and selectively raised and lowered thereby, as desired, the drive and mechanism for controlling winch 25 likewise being known to the art.

The hole forming mechanism also includes a cylindrical, thin walled hole casing 100 (see FIGS. 6–9 and 11), typically having a wall thickness dimension of about 3/16 inch, with an interior dimension just slightly larger than the outside dimension of the lower end of guide casing 90 so that said hole casing 100 is telescopable a limited extent over the said lower end of guide casing 90, such telescoping action being limited by lug means 101 and 102 fixed as by welding to the exterior surfaces of said guide casing 90 near the lower end thereof. Although lug means 101 and 102 as shown are simply opposed blocks or small plates mounted exteriorly of guide casing 90, it will be readily understood that equivalent lug means can take various other forms, such as an annular ring extending transversely and circumferentially around the guide casing 90, or can be any arrangement of spaced segments of such a ring, functioning to abut all or part of the upper edge of hole casing 100, notched or otherwise recessed as necessary to permit the guide casing extraction tool (see FIGS. 9 and 10) to abut the upper edge of hole casing 100.

The manner of manipulation and operation of stomper 80, guide casing 90, hole casing 100, and the associated elements of the rig, as well as the nature of various further constructional details presented, will be apparent from the following consideration thereof.

Considering the method of hole forming contemplated by the present invention and certain desired modes of operation of the disclosed equipment, vehicle 20 is positioned so that the rear end thereof is at the approximate point where the first hole is to be formed. Assuming that the rig has been transported a substantial distance with the mast assembly 34 titled forwardly (as shown by dotted line in FIG. 1) and with the stomper 80 disengaged from stomper cable 86 and out of the guide casing 90, the stomper 80 is brought to a convenient point on the ground 23 somewhat away from the equipment. The mast assembly 34 is then unlashed, the prime mover equipment started and the mast assembly 34 raised to an upright position either manually or by aid of hold-down cylinder 73, the initial phases of movement of the mast assembly 34 from titled to upright position being facilitated by elongation of the linkage between tie plate 74 and tie plate 75 provided by said hydraulic cylinder 73. Since the mast assembly 34 is swung about an arc pivoted at trunnions 38, and since hydraulic cylinder 73 is anoched to tie plate 75 below said trunnions 36, it can be readily visualized from an inspection of FIG. 1 that hydraulic cylinder 73 is move shortenable either when the mast assembly 34 is upright, as shown in solid line, or when the mast assembly 34 is tilted sharply forward, as shown in dotted line, than is the case in any intermediate position of said mast assembly 34. This arrangement consequently permits the mass assembly 34 to be "locked" when in either an upright or a tilted position by actuation of hydraulic cylinder 73 to shorten the same as much as possible. Thus, after the mast assembly 34 is upright, cylinder 73 is then actuated to shorten and functions to hold the mast assembly 34 in a locked, upright position, as previously indicated.

With mast assembly 34 in an upright, rigid position, the guide rail assembly is disconnected from hydraulic cylinder 68 (if such has not been done while transporting the equipment) by removing the connection between tie plate 66 and the right hand end of the cylinder 68 as viewed in FIG. 1, which then permits the lower end of the depending elements including the guide rail assembly and guide casing 90 to be swung outwardly away from vehicle 20. Stomper cable 86 is then led out through the bottom of guide casing 90 and fastened to eye 84 on stomper 80, whereupon the stomper 80 is hauled in by taking in cable 86 onto winch 26 until the stomper 80 passes within guide casing 90, the depending element assembly including guide casing 90 and the guide rail assembly swinging outwardly to permit this movement. As stomper 80 passes into guide casing 90 and is raised free from the ground 23, said depending elements including the guide rail assembly and guide casing 90 will return to a substantially vertical disposition whereupon tie plate 66 and hydraulic cylinder 68 are reconnected.

Having previously noted the depending mechanism providing for compensation of lateral slope of the ground 23, the particularly fore-and-aft position of the lower end of stomper 80 with respect to the desired point on the ground where the hole is to be formed is adjusted by actuation of hydraulic cylinder 70 moving supporting rails 31 and 32 on support base 29. This adjustment, in conjunction with selective actuation of hydraulic cylinder 68 can compensate for for-and-aft slope (as illustrated in FIGS. 1 and 2) of ground 23 and will bring guide casing 90 and stomper 80 to a substantially vertical disposition at the desired point the hole is to be formed so that the hole forming phase of operation can commence.

After such positional manipulation of the stomper 80, guide casing 90, and the guide rail assembly, winch 26 is controlled to successively raise and drop said stomper 80 until the hole is partially formed, FIGS. 1 and 2 showing a typical point of progress in this regard.

As the depth of the hole progresses the risk of the sides thereof caving in from the jar of further drops of the stomper, and more or less from the nature of the earth formation involved, increases. When the point has been reached in the progress of the hole that it is desirable to support the walls thereof, stomper 80 is raised to near the top of guide casing 90, and guide casing 90 is also raised considerably to permit manual insertion of hole casing 100 in the hole to a limited degree, this phase of the operation and arrangement of elements being illustrated in FIG. 6. Alternatively, rather than starting the hole as shown in FIGS. 1 and 2 and then placing hole casing 100 in the hole as shown in FIG. 6, the hole can be started with the hole casing already placed in axial, telescoped position about the lower end of the guide casing so that the hole casing will follow the hole down and support the side walls thereof throughout the entire hole forming operation. This latter procedure is particularly advantageous and desirable if there is an immediate tendency for the side walls of the hole to crumble and no loss of subjacent support of the area surrounding the hole can be tolerated.

After hole casing 100 is in initial position axially of the hole, guide casing 90 is lowered until lugs 101 and 102 near the lower end thereof engage the upper edge of said hole casing 100, whereupon the weight of said guide casing 90 is transferred to said hole casing 100 and serves to move the same downwardly farther into the formed hole, such as shown in FIG. 7.

In connection with the insertion of hole casing 100 into the hole being formed, it is of importance to note that successive drops of a blunt, heavy weight such as stomper 80 do not occur along exactly the same drop axis and as a result the hole formed at any given stage of the operation will be somewhat larger than the diameter of stomper 80. This enlarged diameter of the hole formed, as compared with the diameter of the stomper 80 is taken advantage of in the design of the hole forming elements of the present invention, particularly noting the thin walled nature of hole casing 100 in this regard.

It is a principle of the present invention, demonstrated by experience, that thin-walled hole casing 100 need not be driven into the hole by extended free fall drop or sharp impact force but can be urged into the hole in most instances merely by dead weight of the other hole forming apparatus or at most only a few quite short drops of the stomper and accordingly the hole casing will not collapse nor deform detrimentally even after many uses. Hole casings in actual use and having the thin-walled construction disclosed have been subjected to as many as several thousand usages and are still not detrimentally worn or deformed. Such unexpectedly superior performance notwithstanding the relatively light guide casing and hole casing construction involved represents a remarkable and important contribution to the art. To remark on certain of the reasons for the marked improvement in both lightness and durability of a hole casing set according to the invention, and recalling that there is an enlargement of the hole somewhat beyond the actual diameter of the stomper because of a deviation in the drop axis line of the stomper from one drop to the next, it is to be also noted that successive raising and dropping of the stomper in extended free fall inherently causes a substantial rocking of the whole rig as the stomper weight is taken by and released from the mast assembly of the rig. Thus, if the supporting vehicle 20 is a conventional flat bed truck, for example, the vehicle will rock on its springs with each drop of the stomper. In a typical installation the top of the mast assembly lays over about 6 inches with each raising or lowering of the stomper. This cyclic rocking movement rocks the suspension means for the guide rail assembly and guide casing. With the bottom of the guide casing telescoped in the hole casing and thus anchored in the hole being formed, there is in turn a cyclic rocking of both the guide casing and hole casing in the hole, tending to somewhat further enlarge the same. With the dead weight of the guide casing continually on the hole casing and with the hole being continually slightly enlarged by the rocking action of both therein, the hole casing will more or less be worked slowly and gradually downwardly into the hole further even during successive extended free fall drops of the stomper. It has been noted that this effect is somewhat more pronounced when the rig overhangs the side of the vehicle rather than the rear thereof and the reason therefor is attributed to the fact that the extent of "rock" of the rig when at the side of the vehicle is noticeably more than when at the rear of the vehicle because of the shorter leverage factor of the vehicle supporting springs laterally thereof.

Another factor involved and contributing to the efficiency in operation of the type of hole forming mechanism here presented is also founded in the fact that inherently substantial clearance develops between the stomper on the one hand and the hole formed and the hole casing on the other hand. This clearance in a given equipment now in use averages about ¾ inch around the stomper. Blunt stomper 80 would act much like a piston and to an extent cushion its extended free fall drop if it were not for this clearance. Further, with the pulverizing action occasioned by the blunt ended stomper and nubs and edge lip thereon, a significant amount of the impacted material is actually carried out of the hole by the rush of escaping air with each drop of the stomper.

In bringing at least a portion of the dead weight of the stomper 80 into forcing relation with hole casing 100, as shown in FIG. 8, a stop element in the form of bar 105 is passed through a selected pair of horizontally opposed holes 103 in guide casing 90, said holes 103 being suitably reinforced as by plates 104, if desired. The bar 105 thus is interposed in the path of travel of stomper 80, which has of course been raised to permit such insertion of bar 105, the stomper 80 then being lowered down onto said bar 105 without free fall drop or at most a free fall drop of only a few inches by selective control of the release mechanism for winch 26. Since the stomper 80 weighs about 4,000 pounds in the example here presented, dead weight is available from stomper 80 in practically all instances to urge said hole casing 100 further downwardly into the hole being formed as may be necessary at any given phase of the operation, but occasionally heavy rock or the like will render necessary a slight drop of the stomper to get the desired hole casing progression into the hole, it being self-evident that the dead weight of the stomper and specific nature of the earth formation at hand necessarily involve corresponding adaptation of the hole casing setting technique employed.

When said hole casing 100 has reached the desired position in the hole, stomper 80 is again raised slightly and bar 105 is then removed, whereupon the successive raising and dropping of stomper 80 is continued to further deepen the hole.

It is to be noted in connection with the manner of placement of hole casing 100 illustrated in FIG. 8, that such positioning of said hole casing 100 can continue until the upper edge of said hole casing 100 is well below the surface of the ground, since the guide casing 90 can continue to follow said hole casing down into the hole being formed and the weight of the stomper 80 selectively exerted thereon, the bar 105 being inserted in progressively upwardly disposed pairs of holes 103 in guide casing 90, as appropriate.

From the manner of progression of the hole casing 100 into the hole being formed as above described and as shown in FIGS. 6–9, for example, and from the nature of the hole casing 100 itself in that it has even upper and lower edges and the same diameter throughout, it will be readily understood that when the upper edge of hole casing 100 progresses into the hole to a point substantially below the surface of ground 23 a second hole casing identical with hole casing 100 can be placed on top of hole casing 100 and the sequence of steps illustrated in FIGS. 6 through 9 repeated as to such second hole casing which will in its progress in turn urge the lower hole casing 100 to lower positions in the hole as the depth of the hole proceeds.

As the desired depth of hole is reached, such as in FIG. 9 for example, stomper 80 is removed from the hole and guide casing 90 is withdrawn from hole casing 100 by suitable extraction or hold-down means such as a stop means interposed between one of the guide rails and the upper edge of said hole casing 100. A typical extraction tool 106 for this purpose is shown in FIG. 9 and mainly comprises a rigid metal strip, notched as at 107 at one end to contact the upper edge of hole casing 100 and provided along the body thereof toward the other end with a series of holes 108, one of which receives a bolt or equivalent projection 109 at the lower end of one of the guide rails, 52 being selected by way of example in FIG. 9. After placement of said tool 106 in the position shown in FIG. 9, guide casing 90 can then be withdrawn upwardly out of hole casing 100 leaving the latter in the hole until removal thereof is desired.

FIG. 10 serves to present a modified form of extraction tool, usable in lieu of the unattached tool 106 illustrated in FIG. 9, and having the advantage thereover of being fastened directly to the associated guide rail, guide rail 52 again being selected by way of example. In the said modified form of extraction tool, as illustrated in FIG. 10, strap or bar 110 is notched at its free end to engage the upper edge of said hole casing 100 and is hinged at its other end 112 by hinge bolt 113 to flanges 56 and 57 of guide rail 52. A series of opposed pairs of holes 114 are provided in said flanges 56 and 57 to permit vertical adjustment of hinge bolt 113 so that notch 111 and strap 110 can be set to leave hole casing 100 in the hole at the desired level and/or compensate for any variation in distance of the associated guide rail from the ground as may be encountered when the ground is sloping or varies in slope from point to point. As obvious, when utilized for extracting guide casing 90 from hole casing 100, said strap 110 hangs downwardly and is pressed against the side of guide casing 90 so that notch 111 receives the upper edge of hole casing 100 as said guide casing 90 is withdrawn upwardly from the formed hole. When not so in use, said strap 100 is merely rotated outwardly and upwardly about hinge bolt 113, such movement being indicated at 115, and retained against the web of guide rail 52 by retainer bolt 116 selectively passed through hole 117 in flange 57 and threaded into hole 118 in flange 56, for example.

Having formed the hole with the hole casing 100 set therein at the desired depth, and having withdrawn the stomper 80 and guide casing 90 from the hole, the equipment is then moved on supporting vehicle 20 to the next hole location and the hole forming sequence there repeated.

Meanwhile, a given hole casing 100 can be left in its hole indefinitely, since even a multiplicity of hole casings can be readily fabricated and used with a given mobile rig. For simplicity in fabrication the hole casings are advantageously simply sectioned from pipeline or well tubing stock or the like.

It is often the practice in the highway guard rail post installation field to first insert the guide post into the formed hole, fill the hole loosely and then withdraw the hole casing. The techniques and equipment of the present invention are ideally suited to this type of post installation since hole casings 100 may be readily provided in large numbers and since they may be easily withdrawn from the hole even with a post placed in the hole, with or without loose fill also in the hole.

To demonstrate the simplicity of the removal of a given hole casing 100 from a formed hole either before or after a post is placed therein, FIG. 11 shows the hole casing 100 in the hole, with an opposed pair of apertures 120 and 121 into which chain hooks 122 and 123 of conventional design of a hoist chain 124 are readily insertable, the hole casing 100 being extracted from the hole merely by an upward pull on hoist chain 124, as schematically indicated at 125. The extraction of a series of hole casings 100 is simply accomplished, for example, by a small mobile auxiliary power equipment unit such as a tractor having suitable hoisting or lift mechanism.

Equipment according to the present invention is at present being used rather extensively for rapidly forming holes of uniform size and depth and at uniform intervals to receive guide rail posts as used along highways. Dimensionally, a typical rig in use is designed for formation of holes to a depth of from four to eight feet to receive reinforced concrete posts about 9 inches in diameter, and utilizes a stomper about 14½ inches in diameter and about 7 feet in length. The guide casing is about 15¼ inches inside diameter and about 16 inches outside diameter (wall thickness ⅜ inch). The hole casing is about 6 feet in height with about 16¼ inches inside diameter and about 16⅝ inches outside diameter. The hole punched by the stomper averages about 16 inches diameter (larger than the stomper because of the aforesaid rocking action of the rig in operation and some degree of variation in lateral position of the stomper during successive drops). The resulting hole formed by the hole casing is of course about 16⅝ inches. The typical design thereof as above presented, is of course set forth merely by way of illustration and not limitation as to the essential features of the invention and it will be readily understood that machines of similar construction involving the characteristic relation of elements and/or modes of operation can be readily developed by those skilled in the art and adapted to the forming of holes of greater or lesser depth and also of greater or lesser diameter, as desired.

Thus, various further modifications as to equipment construction and manner of operation will be apparent to those skilled in the arts and to which applicant's invention is directed, within the scope of the following claims.

What is claimed is:

1. In a method of impact hole forming by successive extended free fall drops of a stomper directly on the ground, arranging a hole casing only slightly larger than the stomper axially in the hole being formed, urging the hole casing downwardly into the hole under the force of at least a portion of the dead weight of the stomper but not the drop force of extended free fall thereof, and thereafter progressively and alternately dropping the stomper *in fully guided free fall* to deepen the hole and urging said hole casing further downwardly into the hole under such force until the desired hole depth is reached.

2. A method of hole forming according to claim 1, comprising urging the hole casing into the hole by utilizing a vertically movable stomper guide casing about which the hole casing can telescope to a limited degree, then interposing a stop means between the stomper and the guide casing, lowering the stomper against the stop means, and selectively transmitting at least a portion of the dead weight of the stomper to the hole casing.

3. A hole forming method according to claim 2, comprising guiding said stomper guide casing by a vertically stationary guide means and, after the hole is formed with the hole casing in wall supporting position therein, separating the guide casing from the hole casing without removal of the latter from the hole by interposing stop means between said vertically stationary guide means and the upper edge of the hole casing while upwardly withdrawing said guide casing.

4. A method of forming a hole in hard ground where rocks or other earth formations render boring or digging impractical, comprising dropping a heavy stomper in extended free fall directly on the ground while maintaining a hole casing only slightly larger than the stomper axially aligned in the hole thus being formed, then, after the free fall drop of the stomper, urging the hole casing downwardly into the hole under the force of at least a portion of the dead weight of the stomper but not the drop force of extended free fall thereof, and thereafter again dropping said stomper in free fall to deepen the hole and alternately again urging said hole casing downwardly into the hole under such force until the desired hole depth is reached.

5. A method of operating a hole forming mechanism having a stomper element selectively raised and dropped in extended free fall in a stomper guide and having a thin walled hole casing snugly telescopable a limited degree over the lower end of said guide, said method comprising raising the stomper and stomper guide until the lower ends thereof are considerably above the hole being formed, placing the hole casing in a position of axial alignment with the hole being formed, interposing stop means in the path of travel of the stomper in the stomper guide, selectively lowering the stomper against said stop means only to the extent necessary for urging the hole casing downwardly into the hole, removing said stop means, and thereafter dropping the stomper in extended free fall to deepen the hole.

6. A hole forming mechanism comprising a support disposed uprightly and outwardly on a ground supported vehicle, a cylindrical, thin-walled guide casing means depending supported from and vertically movable on said support, a heavy stomper element suspended from said support and vertically movable within said guide casing to be droppable directly on the ground, a cylindrical, thin-walled hole casing only slightly larger than said guide casing means, dimensioned to snugly telescope over the lower end of said guide casing means, means for recurrently transmitting at least a portion of only the dead weight of the stomper to the guide casing, and means projecting from said guide casing means near the lower end thereof limiting the degree to which said hole casing telescopes thereover and moving said hole casing into the hole progressively downwardly on the occasion of progressive downward movement of said guide casing.

7. A hole forming mechanism according to claim 6, wherein said guide casing means has a plurality of vertically arranged, horizontally opposed pairs of holes, said mechanism further comprising stop means readily insertable through a selected pair of said holes to transfer at least a part of the dead weight of said stomper through said guide casing to said hole casing, the said stop means further being readily withdrawable from said guide casing.

8. A hole forming mechanism comprising a ground supported vehicle having outwardly directed, overhanging support means, a vertically stationary guide rail assembly suspended from the upper portion of said support means, cylindrical guide casing means vertically movable between and guided by said guide rails, a blunt, heavy stomper element vertically movable within said guide casing and droppable directly on the ground, power means selectively raising and lowering said guide casing, power means selectively raising, lowering or dropping said stomper, lug means exteriorly positioned near the lower end of said guide casing, and a cylindrical hole casing only slightly larger than said guide casing, dimensioned to snugly telescope over the lower end of said guide casing and be moved progressively downwardly by the said lug means thereon into the hole being formed, progressive movement of said hole casing being caused by progressive and selective downward movement of said guide casing, the said guide casing having a vertically arranged series of horizontally opposed pairs of holes therein through which a bar-like element stop means is readily insertable to selectively receive at least a part of the dead weight of said stomper but not the drop force of extended free fall thereof and transfer the same through said guide casing to said hole casing and cause such downward movement of the latter into the formed hole to support the side walls thereof, the said stop means further being readily withdrawable from said guide casing, permitting subsequent extended free fall drops of said stomper.

9. A hole forming mechanism according to claim 8, comprising a second stop means selectively interposable between one of said guide rails and the upper edge portion of said hole casing when the latter is in wall supporting position in the formed hole, such second stop means enabling selective withdrawal of the lower end of said guide casing from said hole casing without removal of the hole casing from the hole.

10. A hole forming mechanism according to claim 8, wherein the said vertically arranged series of horizontally opposed pairs of holes in the said guide casing are reinforced at least in the lower portions thereof.

11. In a method of forming a hole in the ground by extended free fall drops of a heavy weight, the manipulative steps of repeatedly dropping the heavy weight directly on the ground *in fully guided free fall,* maintaining a thin walled hole casing in wall supporting position in the hole being thus formed, and recurrently applying at least a portion of the mass of said weight but not the free fall impact force thereof to the thin-walled hole casing to urge said casing farther into the ground.

12. In a method of forming a hole in the ground by extended free fall drops of a heavy weight, the manipulative steps of repeatedly dropping the heavy weight directly on the ground, disposing in wall supporting position in the hole being formed a thin-walled hole casing interiorly only slightly larger than the lateral dimension of the weight, disposing a guide casing in telescoped relation in said hole casing, recurrently applying at least a portion of the mass of said weight but not the free wall impact force thereof to the hole casing through the guide casing, and recurrently lifting said heavy weight in said guide casing in a manner causing a slight change in the angle of drop of said weight and the angle of the axis of said hole casing with respect to the axis of said hole, thereby facilitating the penetration of the casing farther into the ground substantially without risk of fracture or distortion of the casing.

13. The method of rapidly forming a hole in the ground and supporting the walls thereof, comprising the manipulative steps of placing a thin-walled hole casing on the ground at the point where a hole is to be formed, axially aligning a drop weight and a guide casing with said hole casing, repeatedly impacting the drop weight on the ground by extended free fall drops thereof within said guide casing and said hole casing, recurrently and selectively exerting at least a portion of the dead weight of said drop weight but not the impact force thereof through said guide casing to said hole casing, causing the latter to be forced into wall supporting position in the hole being formed, and withdrawing said drop weight and said guide casing from said hole casing after the hole is formed, leaving the hole casing in the formed hole.

14. A method according to claim 13, as applied to highway guard post and rail construction or the like, such method further comprising thus forming a series of holes, leaving each hole casing in its formed hole in the series, and subsequently filling each hole and withdrawing its associated hole casing as each guard post is placed in its aligned position.

15. In a hole forming mechanism, the combination comprising a thin-walled hole casing positionable with its axis substantially at the center of a hole to be formed, a guide casing coaxially superposed on said hole casing, means projecting from the surface of said guide casing for limiting the extent of downward movement of said guide casing with respect to said hole casing, a heavy drop weight arranged to be raised and dropped directly on the ground in extended free fall coaxially within said guide casing and said hole casing, power means for raising and dropping said drop weight, and means for recurrently applying at least a portion of the mass of said drop weight but not the impact force thereof through said guide casing to said hole casing to urge the same into wall supporting position in the hole formed by successive drops of said drop weight.

16. In a hole forming mechanism, the combination comprising a heavy drop weight arranged to be raised and dropped directly on the ground in extended free fall, guide means coaxially surrounding said drop weight, and hole wall supporting means also coaxially disposed with respect to said drop weight and contacting said guide means through projecting means on the lower end of said guide means, such combination further comprising means for recurrently transferring to said hole wall supporting means at least a portion of the mass of said drop weight through said guide means.

17. In a hole forming mechanism comprising a spring mounted, ground supported vehicle with support means extending therefrom and overhanging the ground, vertically extending guide means suspended from said support means, a blunt, heavy cylindrically shaped stomper element vertically movable within said guide means, an open-ended, cylindrically shaped hole casing snugly surrounding and telescoping over a substantial length of the lower portion of said guide means, lug means situated on said guide means near the lower end thereof for limiting the extent of telescoping movement of the hole casing thereon, power means selectively raising and lowering said guide means, power means selectively raising and dropping said stomper directly on the ground and coaxially within said guide means and said hole casing, and means by which at least a portion of the mass of said stomper but not the free fall impact force thereof is transmitted to said guide means, the suspension of said stomper and said guide means on said spring mounted vehicle and the telescoped relation of the guide means and the hole casing recurrently causing slight variation in the angle of drop of said weight and the angle of the axis of said hole casing with respect to the axis of said hole as said stomper is raised and dropped, such angular variation and the action of the transmitted mass of the stomper cooperatively facilitating movement of the casing into hole wall supporting position substantially without risk of fracture or distortion of the casing.

18. In a mechanism for forming a hole in the ground, a combination comprising a ground supported vehicle, a ground overhanging support on said vehicle, drop weight guide means depending from said support, a drop weight suspended over and vertically movable coaxially within said guide means to be droppable directly on the ground, means for selectively raising and dropping said drop weight in said guide means, a hole casing telescopable on *the* lower end of said guide means, projecting means situated outwardly on the said guide means to limit the degree of telescoping movement of the hole casing thereon, by means of which said hole casing is moved into the formed hole progressively downwardly on the occasion of the progressive downward movement of said guide casing, and means including the guide casing and its said projecting means for transporting at least a portion of the dead weight of the drop weight to said hole casing and urge the hole casing into hole wall supporting position without sharp impact.

*19. The method of forming a hole in the ground by fully guided, free fall drops of a blunt, heavy stomper into an encased hole, comprising placing a thin-walled hole casing in coaxial position in the hole being formed, successively impacting the stomper coaxially within the hole casing and into the hole in fully guided free fall drops, urging said thin-walled hole casing into hole encasing position by dead weight of the stomper exerted downwardly against said hole casing, and thereafter again impacting the stomper into the encased hole in fully guided free fall to deepen the hole.*

*20. A method of operating a hole forming mechanism having a stomper element selectively raised and dropped in extended, fully guided free fall into an encased hole, said method comprising raising the stomper element above the hole being formed, placing the hole casing in a position of axial alignment with the hole being formed, interposing stop means in the path of travel of said stomper element above said hole casing, selectively lowering the stomper element against said stop means only to the extent necessary for urging the hole casing downwardly into the hole, removing said stop means from the path of travel of the stomper element, and thereafter again dropping the stomper element in fully guided free fall to further deepen the hole.*

*21. A method of forming a hole in hard ground where*

*rocks or other earth formations render boring or digging impractical, comprising dropping a heavy stomper in fully guided free fall directly on the ground while maintaining a hole casing only slightly larger than the stomper axially aligned in the hole thus being formed, then, after the fully guided free fall drop of the stomper, urging the hole casing downwardly into the hole under the force of at least a portion of the dead weight of the stomper but not the drop force of extended free fall thereof, and thereafter again dropping said stomper in fully guided free fall to deepen the hole and alternately again urging said hole casing downwardly into the hole under such force until the desired hole depth is reached.*

References Cited in the file of this patent or the original patent

UNITED STATES PATENTS

| | | |
|---|---|---|
| 202,023 | Grubs | Apr. 2, 1878 |
| 1,010,723 | Clark | Dec. 5, 1911 |
| 1,263,661 | Grant et al. | Apr. 23, 1918 |
| 2,122,686 | Gaty | July 5, 1938 |
| 2,545,913 | Bock | Mar. 20, 1951 |
| 2,660,403 | Roland | Nov. 24, 1953 |

FOREIGN PATENTS

| | | |
|---|---|---|
| 810,809 | France | Jan. 6, 1937 |